Patented June 15, 1926.

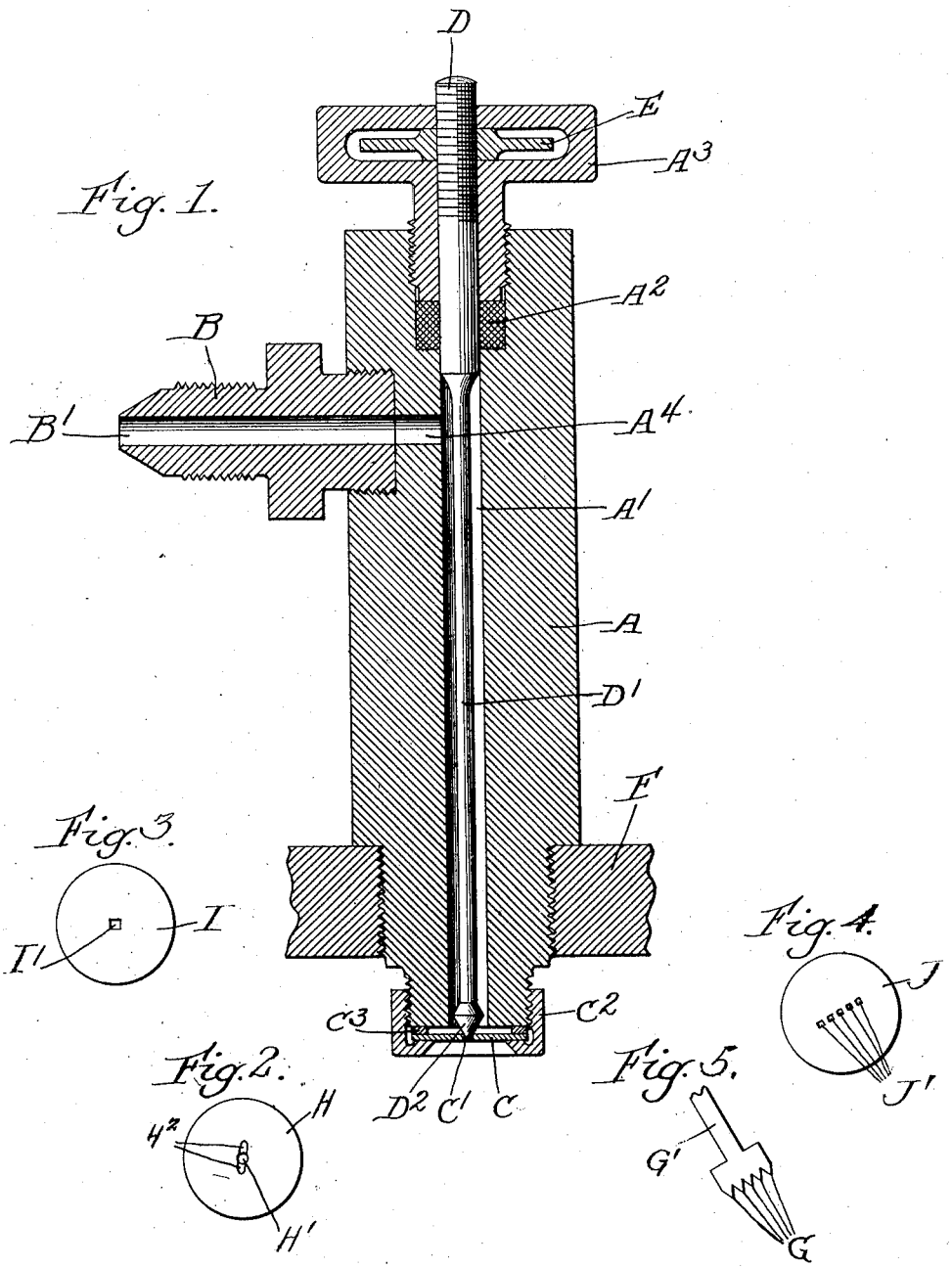

1,589,245

UNITED STATES PATENT OFFICE.

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK.

INJECTION VALVE.

Original application filed July 3, 1919, Serial No. 308,445. Divided and this application filed November 5, 1921. Serial No. 513,150.

This application which is a division of application No. 308,445, filed July 3, 1919, relates to injection valves for internal combustion engines adapted to be used for the solid, direct injection of fuel into a combustion chamber under pressure without the use of any air or gas under pressure.

This present device takes the form of a perforated disc rigidly supported about its periphery and associated with a member which normally closes the perforation, but when liquid fuel is introduced, exerting a pressure against the disc which tends to deflect or bend it so as to bring the disc out of engagement with the closing member, permitting the passage of the liquid through the minute annular opening between the closing member and the walls of the perforation.

It may happen and has happened that when the disc was too heavy and strong, the pressure acutally caused a raising up of the entire needle valve stem, and a giving or yielding of the yoke holding it down, but in any event some stiff and heavy part or some more or less rigidly supported part must give a very short distance to permit the opening of the valve.

My invention is illustrated in the accompanying drawings wherein:

Figure 1 is a vertical section of the preferred form of my valve;

Figure 2 is a plan view of a disc upon the surface of which are radial scratches terminating in the perforation;

Figure 3 is a disc in which the perforation is angular;

Figure 4 is a plan view of a disc in which there is a plurality of perforations;

Figure 5 is a multiple needle point for use with such a disc.

Like parts are indicated by like characters in all the figures.

A is the body of an injection valve having the central bore $A^1$ enlarged at its upper end. $A^2$ is a packing in said enlargement. $A^3$ is a supporting member screw-threaded into the enlargement of the bore $A^1$. The valve body is screw-threaded into an engine cylinder wall F which is of course, only diagrammatically shown.

B is an inlet connection having the central bore $B^1$ in register with the bore $A^4$ of the valve and communicating through it with the central bore $A^1$.

C is a valve disc having perforation $C^1$. It is held to the valve body by the retaining cap $C^2$ and is spaced from it by the gasket ring $C^3$.

D is a valve stem in the central bore $A^1$, reduced throughout the greater part of its length as at $D^1$, and terminating in an enlarged valve head or point $D^2$ which engages the disc C, and normally closes the perforation $C^1$.

The end wheel E engaging the screw-threaded end of the stem D is adapted to move the point $D^2$ toward and from the disc C to vary the pressure upon the disc and thus the response of the valve to the outworking variations of the fuel pressure.

I have shown in Figures 3 to 6 inclusive, series of modified forms of valve discs adapted to be used in the general device which I have shown. For instance: In Figure 2 a disc H is provided with a perforation $H^1$ which is notched as at $H^2$.

In Figure 3 a disc I is provided with a generally squared perforation $I^1$. The object of these modified forms is to control or modify the shape or position of the spray. In effect these forms embody perforations through the disc which are other than circular and the spray is thus discharged in a form different from that which is the case where a circular perforation is used. The object of this, as of all the arrangements shown, is to control or modify the shape or position of the spray. The device of Figure 2 will give a fan shaped spray. The device of Figure 3 will give a general conical shaped spray but possibly a little thicker at the corners.

In Figures 4 and 5, I have shown a further modification in that the disc J has a series of perforations $J^1$. I have shown them square though, of course, they might be of other shapes. This series of perforations is engaged by the valve head or points GG carried on the valve stem $G^1$. These perforations may be smaller than any one of the single perforations and experience develops the interesting fact that under certain conditions, I am able to get a very satisfactory spray with the device of 4 and 5 with much lower pressure than with the other devices. I have shown these different spray discs and points because they all have one thing in common, namely: The valve is closed by the pressure of a valve stem forcing a point against a disc and thus closing an aperture therein, and the only way in which the fuel under pressure in the fuel system can get out, is by actually pushing the disc away from the movable valve point so as to provide a clearance between the valve point and the disc. This is the deformation of the actual material itself and it will be understood that the greater the initial tension of the spring disc, set up by the pressure of the valve stem against the disc, the greater must be the pressure of the liquid which pushes the disc away and takes it out of contact with the valve points.

Another characteristic, of course, is that we have both an actual stretch of the metal and a deflection of the metal, as the valve discs give. The result of this is that I have what is, in effect, an exceedingly stiff spring, and the yielding of the disc, as the pressure increases, is but slight thus a very narrow aperture is made for the passage of the fuel and the valve closes up again, immediately the pressure has dropped down below the point at which the release is expected to take place.

One peculiar characteristic of the device wherein I have a plurality of needle points, is that the two needle points at either end of the group engage the corresponding holes in the disc and act as guides to position and center the other needle points in the remaining holes because the deflection of the disc which is outwardly carried when the pressure is applied to it permits an opening of the intermediate holes while the end holes and points are still in contact.

In the form of mechanism here shown, my minute opening is uncovered or made effective or produced by the deflection or spring like action of the material of which the valve is composed, but it is conceivable, of course, that such a microscopic opening could be developed or uncovered by other means. A valve seat so shaped with reference to the valve that some portions of the seat will offer unequal resistance to deflection, thereby confining the spray to certain portions or causing it to flow with greater thickness at certain points, may be employed. This is illustrated for example, in the application of the conically shaped valve shown in Figure 1 to the disc having a square hole, illustrated in Figure 3. On the other hand a valve seat may be formed so that the varying thickness or tension of the metal will cause the valve to yield unequally at different points along the seat, thereby giving a desired shape to the spray. This is illustrated in Figure 2. The valve of the device as illustrated in the drawing, is intended to be forced into the opening whatever shape it may have in the disc until it closes the opening and what has just been said about the possible peculiarities of the valve seats, will flow from the application of a valve of a given type to a disc having a hole of dissimilar shape or to a disc having unequal support about the hole.

The use and operation of my invention are as follows:—

Whatever form of spray opening I employ or whatever form of apparatus is used in connection therewith and in whatever manner the opening is produced responsive to the pressure of the fluid, the opening must, in its narrow dimension or width, be microscopic, while its other dimension or length, must be such as under the conditions to produce a uniform spray. Of course, it would be possible to use a microscopic opening and sacrifice the uniformity of the spray. This would not be good practice. The essential thing at least, is the microscopic opening. With respect to the particular form of mechanism here illustrated the operation is as follows:—

With whatever form of disc used, the operation is similar. The disc is positioned against the end of a valve body and the needle point or points, by means of the adjusting screw, are thrust into the perforations of the disc, as so as to make a tight fit. Fuel is then supplied under pressure to the central bore of the valve. By means of this pressure, the valve disc is distorted and moved away from the needle points so as to provide sufficient clearance between it and them to allow fuel to be forced through the clearance thus formed and into the combustion chamber.

My experience seems to show that while many different devices may be used by me for accomplishing the fine atomization or spray of the liquid, still they all have in common the fact that the valve opens such a very slight amount as to permit the liquid to pass through an exceedingly minute passage and it is because of this minute passage that I get the desired result. It is possible that because the passage is minute, we may set up mass vibration of the apparatus parts at times to break down the liquid structure and thus atomize it, or the action may be associated with sudden changes in pressure including actual compression of the liquid itself or it may be that the high velocities used have something to do with accomplishing the result, or it may be that the approach that I have suggested to molecular conditions with respect to the thickness of the spray as it leaves the opening, may bring about the desired result. In any event, the common thing that experience shows is essential is a valve which opens but a very small distance and provides an excessively minute passage through which the material may be forced.

I have used the term disc, but do not wish to be limited to any particular configuration. A device suitable for the purpose might have any perimeter. It might be circular or rectangular or otherwise. As previously suggested, I have here shown a particular form of device which in operation develops a fluid inlet opening of microscopic width and I do not wish to be limited to the particular form shown.

Another important object in having the fluid inlet opening of microscopic width is the fact that when the supply is discontinued, the valve portions being separated by a miscroscopic distance can instantly resume their closed or fixed or normal positions so as to instantly cut off the supply of fuel and prevent drooling or anything analogous to it. In the structure shown, the disc itself is elastic and comprises a very small amount of material which is in close proximity to the opening and in any such form of the device, that is where the moving part is small and in close proximity to the opening, the inertia of the valve mass that must be started and stopped at each opening, is reduced to a minimum and little of the closing energy wasted in lieu of starting and stopping metal masses. By putting the elastic parts under greater strain, the resistance to the deflection can be increased and the elastic force of closing increased so as to facilitate the above described action. By utilizing means to increase adjustably the stress with which the valve and valve seat or valve forming parts are held in contact, the degree of pressure at which the valve will uncover its opening, can be altered and thereby the pressure of the initial flow regulated. It will be understood, of course, that where I have spoken of a single perforation or opening, I have done so to describe the particular mechanism shown but the operation is equally within the scope of my invention where more than one opening is used. One specific form of multiple opening has been shown but others could be used.

Valves which require to be operated at very frequent intervals present a difficulty in that the metal mass required to be moved in order to uncover the valve opening has to be accelerated to high velocities or in other words, such mass is subject to great acceleration and thus requires relatively large amounts of energy and is subjected to great strains. I have overcome that by reducing to a minimum the mass of metal subject to acceleration and further so arranging the valve that the portions subject to the greatest acceleration contain the smallest mass and the portions of greatest mass are subjected to the least acceleration. In the particular form of valve here illustrated, I accomplish this result by using a disclike seat which is deflected most at the point nearest the opening. Of course, the same idea can be expressed in widely differing structures. The difficulty is a very serious one and in structures of this nature, valves, where considerable masses of material are to move, consume a large amount of energy and are liable to break.

I claim:

1. In an injection valve, the combination of a valve disc, a perforation other than circular therein and a needle point adapted to penetrate therein and normally to close said perforation, said disc being yieldable under fluid pressure to permit a discharge past said needle point through said perforation.

2. In an injection valve, the combination of a valve disc, a perforation other than circular therein and a needle point adapted to penetrate therein and normally to close said perforation, together with a reenforcing disc adapted to support said perforated disc, said first-mentioned disk being yieldable under fluid pressure to permit a discharge past said needle point through said perforation.

3. In an injection valve the combination of a valve disc, a plurality of perforations other than circular therein and a multiple needle point adapted to penetrate into such perforations and normally to close them, said disc being yieldable under fluid pressure to permit a discharge past said needle points through said perforations.

4. In an injection valve, the combination of a valve disc, a generally rectangular perforation therein and a needle point adapted to penetrate within such perforation and normally to close the same, said disc being yieldable under fluid pressure to permit discharge past said needle through said perforation.

5. In an injection valve the combination of a valve disc having a plurality of perforations with a needle having an equal number of points, the needle points adapted to penetrate into and normally to close the perforations, the disc being yieldable under fluid pressure to open one of said perforations and to permit discharge past the needle point which normally closes said perforation and through such perforation, the other perforations remaining closed at all times.

6. In an injection valve the combination of a valve disc, a plurality of perforations and a needle having the same number of points, one of said points closing each of said perforations, said disc being yieldable under fluid pressure to permit discharge past the needle point in one of said perforations, the needle points in the two outermost perforations remaining seated therein at all times and adapted to serve as a guide to position the needle with relation to all of the holes.

7. In an injection valve the combination of a valve disc, a plurality of perforations other than circular and a needle having the same number of points, one of said points closing each of said perforations, said disc being yieldable under fluid pressure to permit discharge past the needle point in one of said holes, the needle points in the two outermost holes remaining seated therein at all times and adapted to serve as a guide to position the needle with relation to all of the perforations.

Signed at Chicago, county of Cook and State of Illinois, this 2nd day of November, 1921.

PHILIP LANE SCOTT.